March 22, 1955  L. J. FISHER  2,704,539
SKIN SENSITIVITY DETECTOR
Filed Oct. 28, 1952  2 Sheets-Sheet 1

INVENTOR
LOUIS J. FISHER
BY
Mason Graham
ATTORNEYS

March 22, 1955 L. J. FISHER 2,704,539
SKIN SENSITIVITY DETECTOR
Filed Oct. 28, 1952 2 Sheets-Sheet 2

INVENTOR
LOUIS J. FISHER
BY
ATTORNEYS

United States Patent Office 2,704,539
Patented Mar. 22, 1955

2,704,539

SKIN SENSITIVITY DETECTOR

Louis J. Fisher, La Canada, Calif., assignor to Frank B. Smith, Pasadena, Calif.

Application October 28, 1952, Serial No. 317,300

4 Claims. (Cl. 128—2)

This invention has to do with devices for detecting and measuring skin sensitivity.

Neurologists often must, in their treatment of loss of skin sensitivity due to nerve ailments, brain damage or other causes, employ some means of making tests of the sensitivity of an afflicted part in comparison with the sensitivity of some normal part of the body. While sensitivity detecting devices have been proposed, those of which I am aware have not been of a nature which would enable the degree of sensitivity to be measured, for instance, in ounces or grams, and visually indicated upon a dial so that the physician or nurse might make a written record of the degree of sensitivity at the times of making sequential tests, so that it has been impossible to make a record which will enable such comparisons as may be necessary to judge whether or not the patient is improving.

Another shortcoming of known skin sensitivity detectors has been the fact that they are complicated and bulky in construction, so that they are not readily usable by a nurse, for instance, and may not be carried in the pocket for ready use outside the office or hospital.

It is therefore a principal object of my invention to provide a device for detecting and measuring loss of skin sensitivity which is not only simple and economical of construction but is small and compact enough to be carried in the pocket in the manner of a pen or pencil, and which will not only accurately detect loss of skin sensitivity but will also visually display the degrees of sensitivity, measured in ounces or grams, so that a written record thereof may be kept for purposes of comparison.

Other objects and advantages will appear hereinafter.

Without intending thereby to limit the broader scope of my invention, except as may appear in the appended claims, I shall now describe a presently preferred embodiment for which purpose I shall refer to the accompanying drawings wherein:

Figure 1:
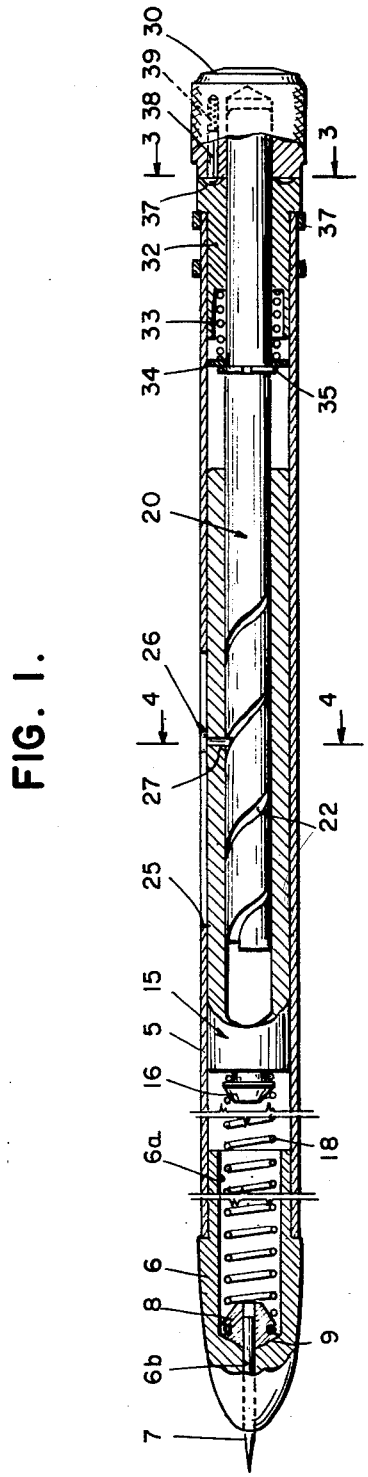
Fig. 1 is a longitudinal medial section of a device embodying my invention.
Figure 2:
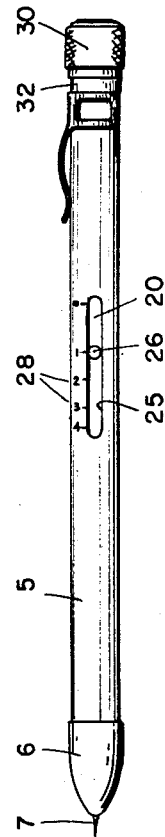
Fig. 2 is a reduced side elevation thereof.
Figure 3:
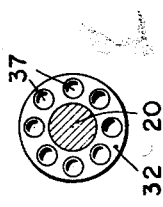
Figure 4:
Figure 4:
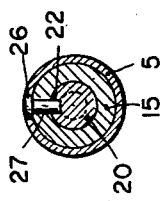
Figure 5:
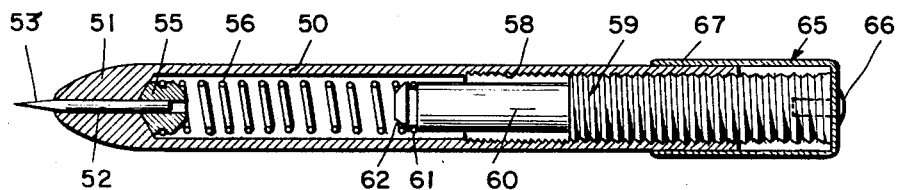
Figure 6:
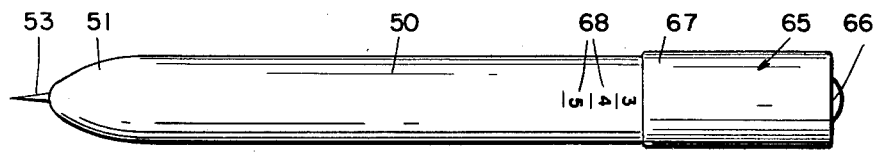
Figure 7:
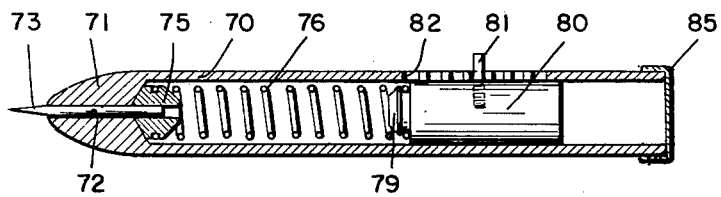

Figs. 3 and 4 are sections taken on lines 3—3 and 4—4, respectively, of Fig. 1;

Fig. 5 is a longitudinal sectional view of a modified form of device embodying my invention;

Fig. 6 is a side elevation thereof;

Fig. 7 is a longitudinal section of another modification; and

Figure 8:
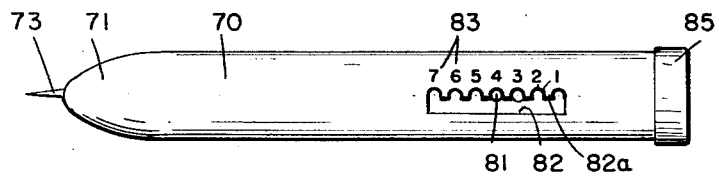

Fig. 8 is a side elevation of the device of Fig. 7.

Referring now to the drawings, the particular embodiment therein illustrated comprises a tubular body or casing 5 in the outer end of which the reduced diameter inner end 6a of a hollow plug 6 is fitted. The plug has an axial bore 6b in its outer end to slidably receive a needle 7 whose inner end is force-fitted into a collar or retaining means 8 which, when the needle is in protracted position, seats against the conical seat 9 provided by that portion of the plug which defines the end of the bore of the plug.

A tubular spring-compressing member or plunger 15 slidably fits in the bore of the casing 5 and has a knob 16 on its reduced inner end to secure the inner end of a compression spring 18, the opposite end of which spring is secured to collar 8.

From this it will be observed that, as the plunger is moved axially toward the plug, the compression of the spring, and consequently the resistance to inward movement of the needle, is increased, and when the plunger is moved in the opposite direction, compression of the spring and resistance to inward movement of the needle is decreased. By moving the plunger outwardly, or to the right, to an extent which will place the spring in tension, the needle will be withdrawn into the casing since the ends of the spring are anchored to the knob 16 and collar 8.

To thus axially move the plunger, an actuating shaft 20 is rotatably disposed in the bore of the plunger and has a spiral peripheral groove 22.

A longitudinal slot 25 of limited extent is provided in the side wall of the casing 5 and a pin 26 extends through a radial hole 27 in the plunger 15. The inner end of the pin extends into the spiral groove, while the outer end of the pin projects into the slot, which slot is only of sufficient width to slidably receive the headed outer end of the pin. Thus, as the shaft 20 is rotated, since the plunger may not rotate, the plunger being held against rotation by engagement of the pin with the side walls of the slot, the plunger is caused to move axially of the bore of the casing by virtue of the cooperation of the inner end of the pin with the spiral groove. The outer surface of the casing along the edge of the slot is calibrated in ounces as shown by indicia 28.

The shaft 20 is manually rotated by means of a knurled cap or knob 30 provided on the outer end of the shaft. The outer end portion of the shaft rotatably extends through a bearing plug 32 frictionally fitted in the inner end of the bore of the casing, and a compression spring 33 bears at one end against the recessed end of said plug and at its other end against a washer 34 which washer, in turn, bears against a snap ring or stop 35 mounted in a corresponding annular groove in the shaft. This spring serves to yieldably hold the cap against the outer end of the plug 32.

When the cap 30 is rotated to rotate the shaft and thus move the plunger 15 to a given position, it is desirable that the cap be yieldably retained in that position so that the position of pin 26 with respect to the indicia 28 may be read at leisure. To accomplish this, the outer end of the plug 32 is provided with a circumferential row of recesses 37 (Fig. 3) and a spring-loaded plunger 38 slidably fits in a longitudinal hole 39 in the cap, which hole is radially offset from the longitudinal axis of the cap.

As will be seen, the device is pencil-shaped and may be conveniently carried in the pocket, and for this purpose I may provide a conventional pocket clip for it.

The spring 18 is selected to provide predetermined resistance to inward movement of the needle 7, which resistance it is my preference to compute in ounces or grams, and the indicia 28 is spaced and arranged so as to accurately indicate the ounces or grams of resistance afforded by the spring.

In use, the physician or nurse will usually first use the needle in protracted position upon some normal skin area of the patient to determine his or her normal skin sensitivity, which will be visually indicated by the position of the pin 26 with reference to the indicia 28. The device is next used to test the sensitivity of the afflicted skin area, which will also be indicated by the position of the pin with respect to the indicia, so that a comparison may be made. The physician or nurse will then make a written record of the two measurements and, when the afflicted skin area of the patient is later again tested, it may be readily determined, by comparison with the earlier test, whether or not the condition of the patient has improved. When the device is not in use the plunger is moved outwardly sufficiently to place the spring 18 in tension, which will retract the needle inwardly of the bore 6b in plug 6.

In the modified embodiment of Figs. 5 and 6, I show a tubular body 50 having a bullet-shaped outer end 51, presenting an axial opening 52 in which a needle 53, like that before described, is mounted for protraction and retraction. A collar or retaining means 55 is secured to the inner end of the needle and a compression spring 56 has one of its ends encircling the reduced diameter portion of the collar so that the spring may not escape therefrom.

The body is internally threaded, as shown at 58, and a screw 59 is threadedly engaged with the threads 58. The screw has a reduced diameter shank portion 60, a further reduced diameter portion 61, and terminates in a relatively larger diameter portion 62, so that the inner end of the spring 56 may be looped thereabout in such manner that the screw may rotate relative to the spring. The outer end of the screw projects from the casing 50 and has a cap 65 secured thereto as by a screw 66. The cap has a sleeve-like skirt portion 67 which encircles the body periphery adjacent its right end. Indicia 68 is disposed in alignment longitudinally of the body periphery in position to be covered and uncovered by the sleeve 67 as the screw is screwed into or out of the casing.

Thus, as the cap is rotated to rotate the screw, as the screw moves inwardly, the spring 56 is compressed to increase the resistance to inward movement of the needle. By visually observing the exposed numeral immediately contiguous the inner end of the sleeve, the user may determine the extent to which the spring is compressed and consequently the ounces of resistance offered to inward movement of the needle. When the device is not in use, the screw 59 may be screwed outwardly until the spring is placed in tension, which will retract the needle into the opening 52.

In the further modification of Figs. 7 and 8, 70 denotes a tubular body having a bullet-shaped outer end 71 presenting an axial opening 72 in which the needle 73 is slidably fitted. Collar or retaining means 75 is secured to the inner end of the needle and a compression spring 76 has one end looped about the collar and its other end looped about the reduced diameter shank portion 79. A plunger 80 has a slide fit in the body to be moved toward and away from the outer end of the body. A radial pin 81 is threaded into the plunger and projects outwardly through a longitudinally slot 82 in the body side wall for movement therealong. As seen in Fig. 8, the slot has spaced enlargements 82a to receive and hold the pin in a selected position, the body carrying indicia 83 denoting grams or ounces of spring pressure. A cap 85 is secured on the right end of the body.

In operation, the spring pressure is varied by axial movement of the plunger 80 through the medium of the pin 81.

I claim:

1. In a device for determining skin sensitivity, a tubular body having a longitudinal slot in its side and having a closed outer end presenting an axial opening therethrough, a needle mounted for protraction and retraction through said opening, a compression spring mounted in the body and yieldably bearing at one end against the inner end of said needle to resist movement thereof inwardly of the body, a plunger axially movably mounted in the body and bearing at one end against the other end of said spring whereby to vary the compression of said spring, said plunger having an axial bore, a shaft rotatably mounted in said bore, said shaft having a spirally disposed peripheral groove, a pin carried by said plunger, said pin having one of its ends extending into said groove and its other end disposed in said slot, and means for rotating said shaft.

2. The device of claim 1 wherein said means for rotating said shaft comprises a cap secured on the outer end of said shaft and rotatably bearing against the contiguous end of the body, said latter end of the body presenting circumferentially spaced recesses underlying said cap, and detent means carried by said cap in position to selectively engage said recesses.

3. In a device for determining skin sensitivity, a tubular body having a longitudinal slot in its side, a hollow plug secured in the outer end of the body, said plug having an axial opening in its outer end, a needle mounted for protraction and retraction through said opening, a collar axially movably mounted in said plug and secured to the inner end of said needle, a plunger mounted for axial movement in the body, a compression spring secured at one end to said collar and at its other end to said plunger, a second plug secured in the other end of the body and having an axial bore therethrough, a shaft mounted for rotation in said plunger and said second plug, said shaft having a stop collar adjacent the inner end of said second plug, a compression spring mounted around said shaft and bearing at its opposite ends against said stop collar and said second plug, said second plug having circumferentially spaced recesses in its outer end, a cap secured on the outer end of said shaft, said cap having an axially offset longitudinally bore, a detent pin slidably mounted in said latter bore for selective engagement in said recesses, said shaft having a spirally disposed peripheral groove, a radial pin carried by said plunger and having one of its ends projecting into said groove to be moved therealong in response to rotation of said shaft and having its other end projecting into said slot.

4. In a device for determining skin sensitivity, a body having an axial bore, a body wall closing the outer end of said bore, said wall having a reduced axial opening therethrough, a needle reciprocally mounted in said reduced opening for protraction and retraction therethrough, said needle having a pointed outer end capable of piercing the skin of a patient, and an inner end carrying a retaining means, a plunger mounted in said bore for axial movement therein toward and away from the outer end of the bore and relative to the body, said plunger terminating at its outer end short of said needle retaining means, a compression spring disposed between and bearing at its respective ends against said retaining means and the outer end of said plunger, and means for axially moving said plunger in said bore to vary the tension of said spring.

References Cited in the file of this patent

FOREIGN PATENTS 495,567     Germany _____ Apr. 8, 1930